US012148973B2

(12) United States Patent
Cochet et al.

(10) Patent No.: US 12,148,973 B2
(45) Date of Patent: Nov. 19, 2024

(54) DEVICE FOR TRANSMITTING A SIGNAL TO A WAVEGUIDE

(71) Applicants: THALES, Courbevoie (FR); ELLIPTIKA, Brest (FR); IMT ATLANTIQUE, Brest (FR)

(72) Inventors: Gwendal Cochet, Brest (FR); Anne-Charlotte Amiaud, Élancourt (FR); Jean-Philippe Coupez, Brest (FR); Alexandre Manchec, Brest (FR); Thomas Merlet, Élancourt (FR); Christian Person, Brest (FR)

(73) Assignees: THALES, Courbevoie (FR); ELLIPTIKA, Brest (FR); IMT ATLANTIQUE, Brest (FR)

( * ) Notice: Subject to any disclaimer, the term of this patent is extended or adjusted under 35 U.S.C. 154(b) by 95 days.

(21) Appl. No.: 17/786,905

(22) PCT Filed: Dec. 18, 2020

(86) PCT No.: PCT/EP2020/087101

§ 371 (c)(1),
(2) Date: Jun. 17, 2022

(87) PCT Pub. No.: WO2021/123224

PCT Pub. Date: Jun. 24, 2021

(65) Prior Publication Data

US 2023/0023880 A1 Jan. 26, 2023

(30) Foreign Application Priority Data

Dec. 18, 2019 (FR) ...................................... 19 14748

(51) Int. Cl.
*H01P 5/107* (2006.01)
*H01Q 13/18* (2006.01)

(52) U.S. Cl.
CPC ............. *H01P 5/107* (2013.01); *H01Q 13/18* (2013.01)

(58) Field of Classification Search
None
See application file for complete search history.

(56) References Cited

U.S. PATENT DOCUMENTS

2004/0119554 A1* 6/2004 Tahara .................... H01P 5/107 333/26
2011/0267153 A1* 11/2011 Hirota ..................... H01P 5/107 333/33

(Continued)

FOREIGN PATENT DOCUMENTS

EP 1396902 A1 3/2004
EP 2862230 A1 4/2015

(Continued)

OTHER PUBLICATIONS

French Search Report, from the French Patent Office in counterpart French Application No. 1914748, dated Nov. 20, 2020.

(Continued)

*Primary Examiner* — Anh Q Tran
(74) *Attorney, Agent, or Firm* — ArentFox Schiff LLP

(57) ABSTRACT

The present invention relates to a device for transmitting a signal between a waveguide and a printed circuit board, the device comprising a first access means and a second access means for the signal to be transmitted, a conductor track forming the first access means, a printed circuit board comprising a substrate, and a transition element. The element comprises an upper ground plane and a lower ground plane that is intended to be in direct contact with the waveguide, the lower ground plane comprising a slot forming the second access means of the transmission device, one (Continued)

Figure 1:
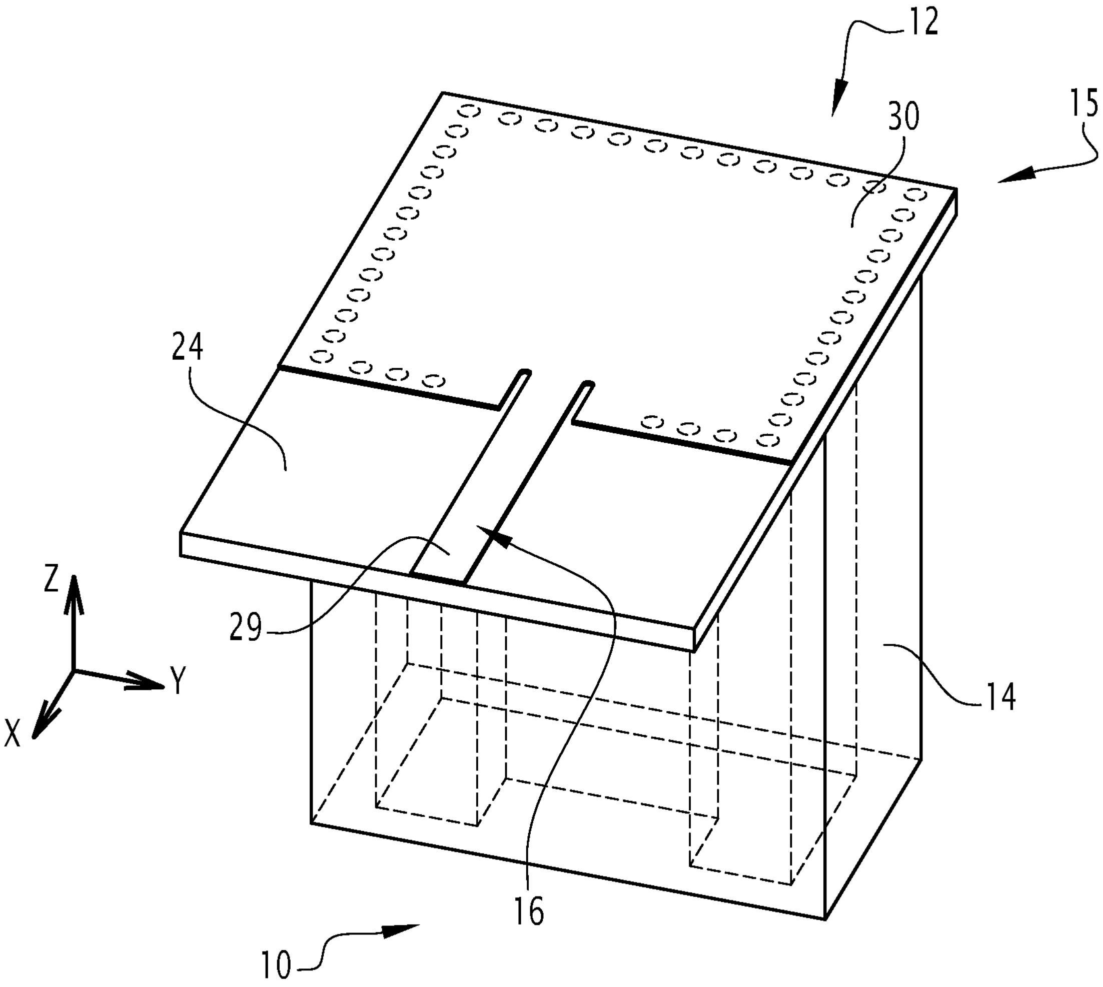

of the upper ground plane and the lower ground plane being connected to the conductor track.

11 Claims, 4 Drawing Sheets

(56) References Cited

U.S. PATENT DOCUMENTS

| | | | | |
|---|---|---|---|---|
| 2016/0204495 | A1* | 7/2016 | Takeda | H01P 5/024<br>333/33 |
| 2019/0148808 | A1* | 5/2019 | Nakajima | H01P 5/08<br>333/239 |
| 2020/0168974 | A1* | 5/2020 | Vosoogh | H01P 1/2005 |

FOREIGN PATENT DOCUMENTS

| | | | |
|---|---|---|---|
| EP | 1396902 | B1 | 9/2015 |
| EP | 2862230 | B1 | 8/2016 |
| JP | 2010-268228 | A | 11/2010 |
| WO | WO 2013189513 | A1 | 12/2013 |

OTHER PUBLICATIONS

International Search Report, issued by International Searching Authority in corresponding International Application No. PCT/EP2020/087101, on Mar. 19, 2021.

* cited by examiner

DEVICE FOR TRANSMITTING A SIGNAL TO A WAVEGUIDE

CROSS-REFERENCE TO RELATED APPLICATIONS

This application is a National Stage Entry of International Patent Application No. PCT/EP2020/087101, filed on Dec. 18, 2020, which claims priority to French Application No. 1914748, filed on Dec. 18, 2019. The disclosures of the priority applications are incorporated in their entirety herein by reference.

The present invention relates to a device for transmitting a signal to a waveguide. The present invention further relates to a corresponding transmission assembly. The present invention further relates to an associated antenna system.

Various designs of PCB-waveguide transitions are known that allow a waveguide to be fed from a PCB.

Some of these designs use a short circuit positioned appropriately to a plunger with a quarter wave cavity. Other models use additional connectors or mechanical parts to make the transition.

However, the use of cavities, connectors or mechanical parts makes the transition cumbersome and difficult to implement.

Transitions using rectangular patches to feed a waveguide are also known.

However, such patches are not suitable for the cross-section of all waveguides.

Transition devices are also known to feed a waveguide with a rectangular cross-section through the short side of the waveguide by means of a so-called SIW (Substrate Integrated Waveguide) cavity.

However, such a device does not allow a waveguide to be fed from its long side. Furthermore, such a device requires the addition of an extra transition between the SIW cavity and a microstrip line or coplanar lines for example.

There is therefore a need for a device to transition a signal from a printed circuit board to a waveguide that is compact, simple to manufacture and adaptable to all types of waveguide.

To this end, the invention relates to a device for transmitting a signal between a waveguide and a printed circuit, the device comprising a first access means for the signal to be transmitted, a second access means for the signal to be transmitted, a conductor track forming the first access means, a printed circuit comprising a substrate, and a transition element. The transition element comprises an upper ground plane formed on the substrate of the printed circuit, a lower ground plane intended to be in direct contact with the waveguide, the lower ground plane comprising a slot forming the second access means of the transmission device and means for delimiting a cavity between the upper ground plane and the lower ground plane, either the upper ground plane or the lower ground plane being connected to the conductor track.

According to other beneficial aspects of the invention, the device comprises one or more of the following features, taken in isolation or in any technically possible combination:

- the cavity is a SIW cavity.
- the cavity is a resonant cavity.
- the cavity is of length λ depending on the length of the substrate, λ being the wavelength of the signal to be transmitted.
- the conductor track protrudes from the upper ground plane.

- the conductor track protrudes from the lower ground plane.
- the lower ground plane is made on the substrate of the printed circuit.
- the means of delimitation are perforations.
- the slot in the lower ground plane is arranged to be in the centre of the cavity delimited by the delimiting means.

The invention also relates to a signal transmission assembly comprising a waveguide, and a device for transmitting a signal between the waveguide and a printed circuit board, the transmission device comprising the printed circuit board as previously described.

According to other beneficial aspects of the invention, the assembly comprises one or more of the following features, taken in isolation or in any technically possible combination:

- where the waveguide is a waveguide having at least one rib along its length, the waveguide being arranged with respect to the lower ground plane so that the slot is substantially equidistant from the rib, on the one hand, and from the top of the waveguide, on the other; and
- when the cross-section of the waveguide is such that the waveguide comprises a cross-sectional length, referred to as the long side, and a cross-sectional width, referred to as the short side, the slot is positioned on the lower ground plane so as to be substantially parallel to the long side of the waveguide.

The invention also relates to an antenna system comprising at least one transmission assembly as described above, advantageously several transmission assemblies as described above, the waveguides of said assemblies being arranged in parallel.

Figure 2:
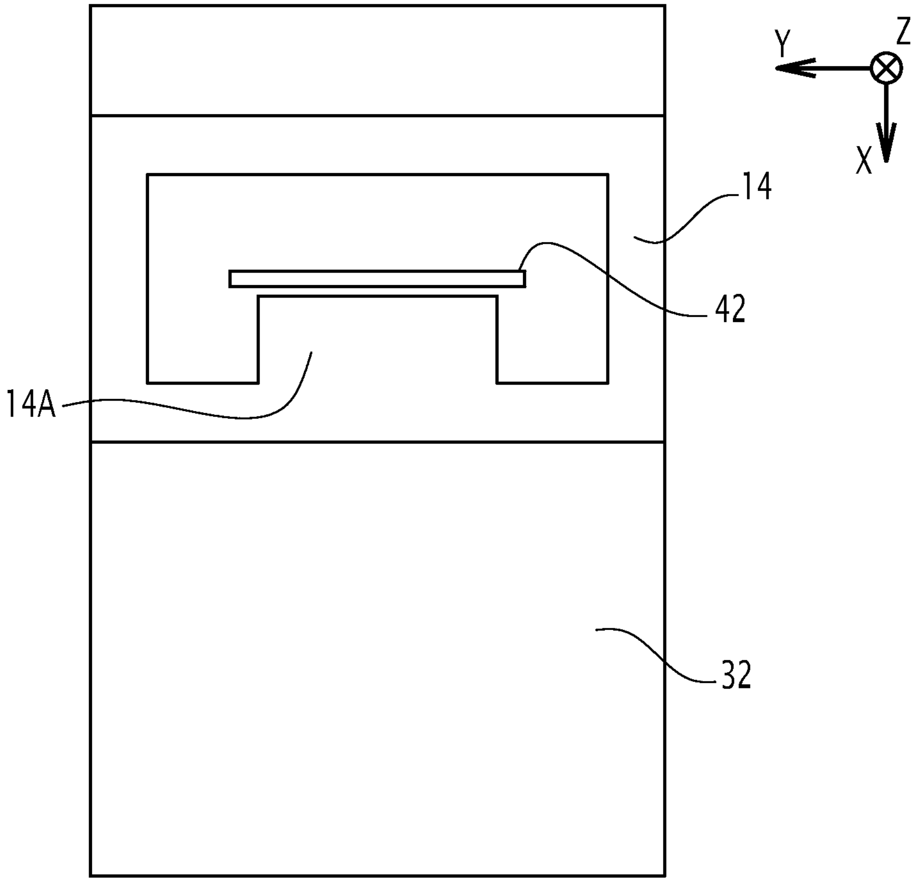
Figure 3:
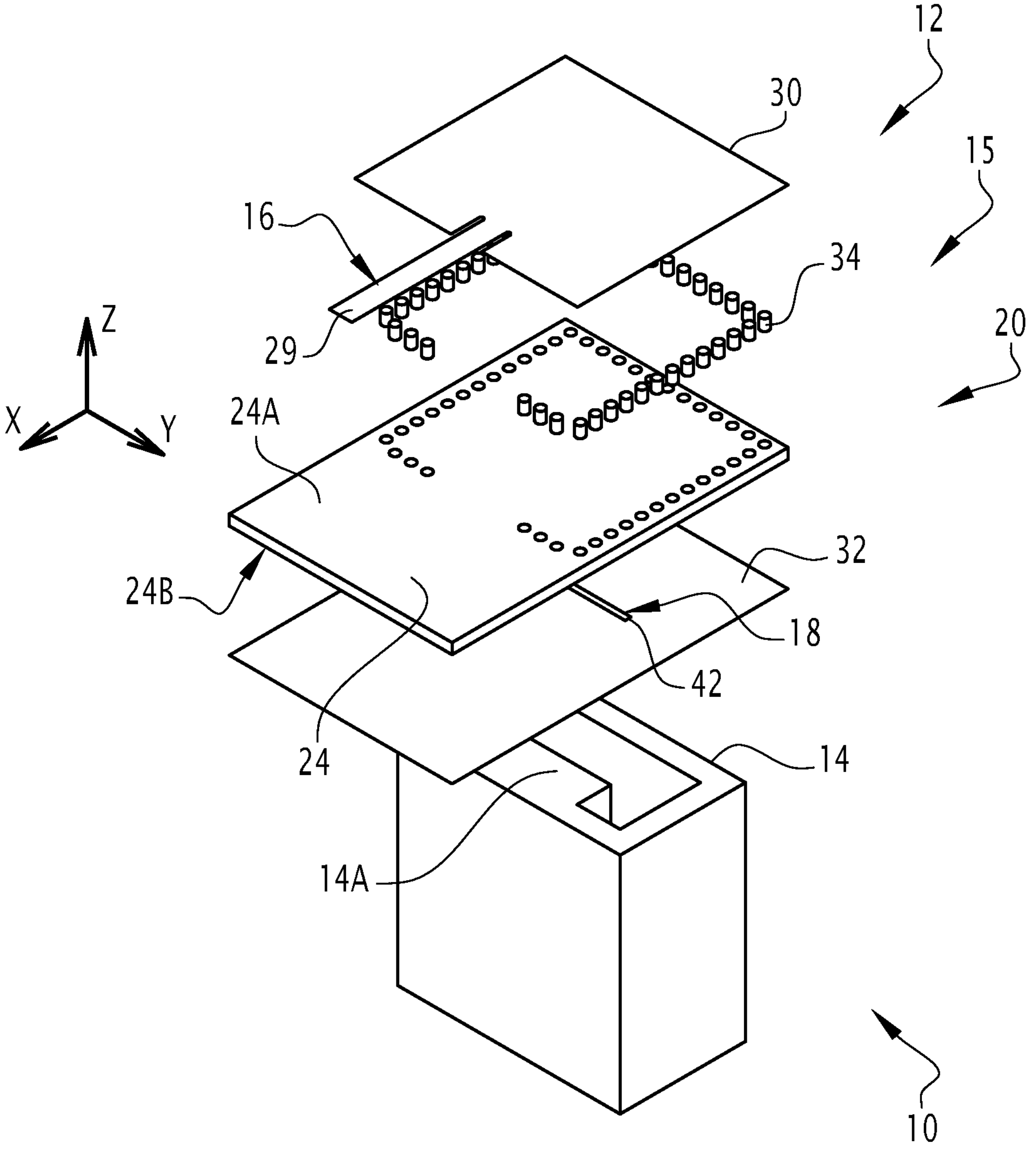
Figure 4:
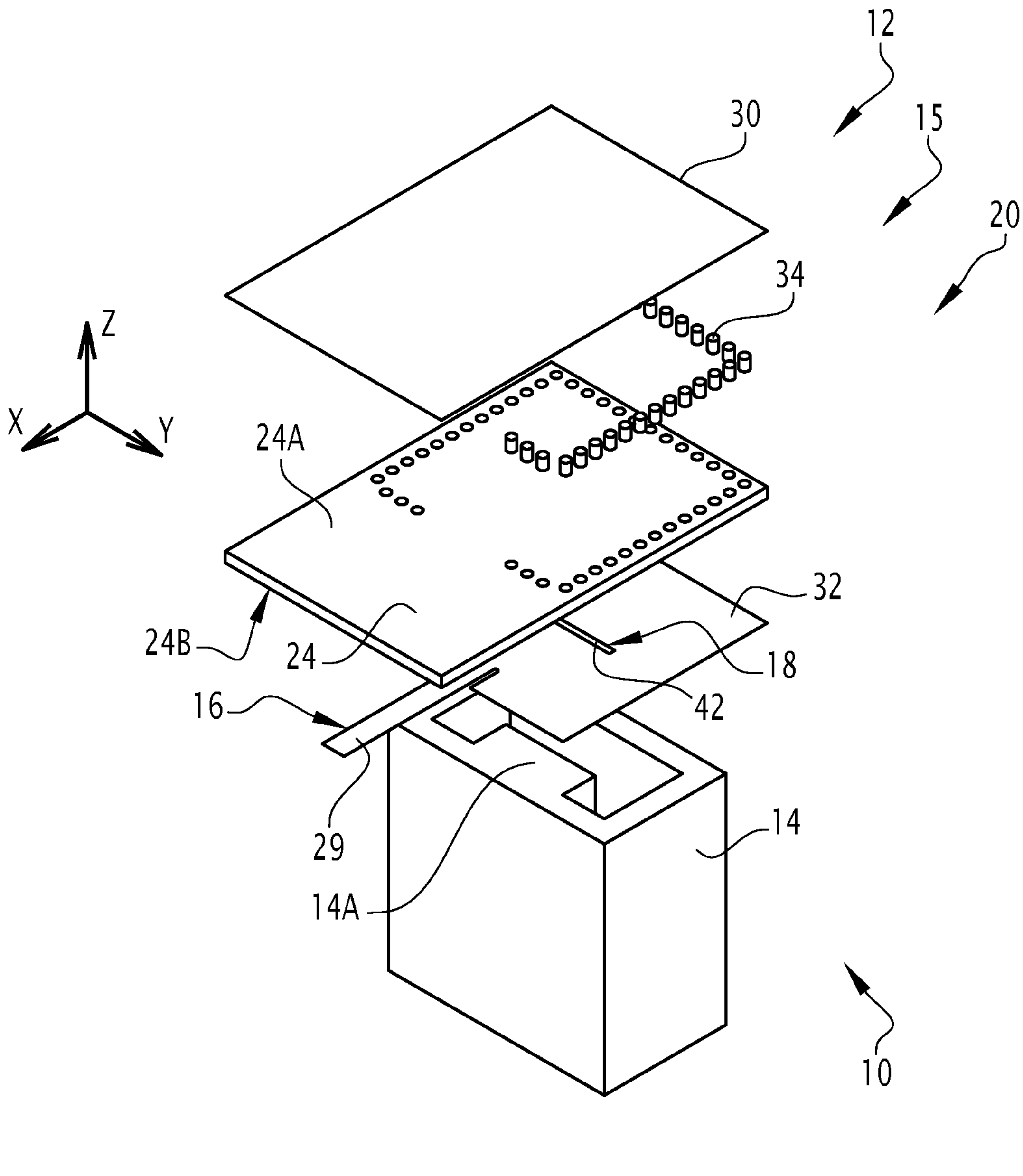

Other characteristics and advantages of the invention will become apparent upon reading the following description of embodiments of the invention, given only as an example and referencing the drawings, in which:

FIG. 1 is a schematic representation, in top view, of a transmission assembly according to a first embodiment, FIG. 2 is a schematic representation, in bottom view, of the assembly of FIG. 1, FIG. 3 is a schematic representation, in exploded view, of the assembly of FIG. 1, and FIG. 4 is a schematic representation, in exploded view, of a transmission assembly according to a second embodiment.

A first embodiment of the transmission assembly 10 is illustrated by FIGS. 1 to 3.

The assembly 10 is configured to transition a signal between a printed circuit board 12 and a waveguide 14. The signal to be transmitted is, for example, a radio frequency signal, the frequency of the signal in this case being between 100 Megahertz (MHz) and 1,000 Gigahertz (GHz).

The assembly 10 comprises the waveguide 14 and a transmission device 15.

The waveguide 14 has a cross-section. The cross-section of the waveguide 14 is, for example, square, rectangular, single-ridge, double-ridge or circular. The single-ridge cross-section is obtained for a waveguide with a rib along its entire length. The double-rib cross-section is obtained for a waveguide with two ribs along its length. The figures in this application illustrate a ridged waveguide having a rib 14A.

In the case of waveguides with a square, rectangular, single-ridge, double-ridge or more generally comprising multiple ribs along their length, the waveguide cross-section comprises a cross-sectional length, known as the "long side" and a cross-sectional width, known as the "short side".

The transmission device 15 comprises the printed circuit board 12, a first access means 16 for the signal to be transmitted, a second access means 18 for the signal to be transmitted, and a transition element 20.

The Printed Circuit Board (PCB) 12 comprises a substrate 24 and, where applicable, printed elements on the substrate 24. The substrate 24 is made of a dielectric material.

In the following description, a longitudinal X direction is defined, represented in the figures by an X axis and corresponding to the length of the substrate 24. In addition, a first transverse direction, known as the stacking direction Z, is defined, perpendicular to the longitudinal direction X and represented in the figures by a Z-axis, and corresponding to the thickness of the substrate 24. A second transverse direction Y perpendicular to the longitudinal direction X and to the first transverse direction Z is also defined. The second transverse direction Y is represented in the figures by a Y-axis and corresponds to the width of the substrate 24.

The substrate 24 comprises two faces 24A, 24B opposite each other in the stacking direction Z. The face of the substrate 24 furthest from the waveguide 14 in the stacking direction Z is referred to as the top face 24A. The face of the substrate 24 closest to the waveguide 14 in the stacking direction Z is referred to as the lower face 24B.

In the case of a signal transmission from the printed circuit board 12 to the waveguide 14, the first access means 16 forms the input for the signal to be transmitted and the second access means 18 forms the output for the signal to be transmitted.

In the case of a signal transmission from the waveguide 14 to the printed circuit board 12, the first access means 16 forms the output for the signal to be transmitted and the second access means 18 forms the input for the signal to be transmitted.

The transition element 20 is configured to transition the signal to be transmitted between the printed circuit board 12 and the waveguide 14, i.e. either from the printed circuit board 12 to the waveguide 14, or from the waveguide 14 to the printed circuit board 12 (reciprocal transition).

The transition element 20 comprises a conductor track 29, an upper ground plane 30, a lower ground plane 32 and means 34 for delimiting a cavity between the upper ground plane 30 and the lower ground plane 32.

The conductor track 29 is a narrow conductor track.

The conductor track 29 forms the first access means 16 of the transmission device 15.

In the example shown in FIGS. 1 to 3, the conductor track 29 is conducted to the upper ground plane 30. In particular, the conductor track 29 protrudes from the upper ground plane 30.

The upper ground plane 30 is provided on the substrate 24 of the printed circuit board 12, i.e. the upper ground plane 30 is an integral part of the printed circuit board 12.

In the embodiment illustrated in FIGS. 1 to 3, the upper ground plane 30 is provided on the upper side 24A of the substrate 24.

The upper ground plane 30 is, for example, a metal plate.

The lower ground plane 32 is intended to be in direct contact with the waveguide 14, in particular with an end section of the waveguide 14.

The lower ground plane 32 is located below the upper ground plane 30 in the stacking direction Z.

The lower ground plane 32 is, for example, a metal plate.

In the example shown in FIGS. 1 to 3, the lower ground plane 32 is provided on the substrate 24 of the printed circuit board 12. More specifically, in the example shown in FIGS. 1 to 3, the lower ground plane 32 is provided on the underside 24B of the substrate 24.

In the example shown in FIGS. 1 to 3, the conductor track 29 and the lower ground plane 32 are therefore separated by the substrate 24. Thus, the conductor track 29, the lower ground plane 32 and the substrate 24 form a microstrip line. The term "microstrip line" refers to a microwave transmission line consisting of two conductors: a narrow strip separated from a ground plane by a dielectric substrate.

The lower ground plane 32 comprises a slot 42 forming the second access means 18 of the transmission device 15.

The slot 42 is for example rectangular in shape. In this case, the slot 42 has, for example, a length along the second transverse direction Y substantially equal to $\lambda/2$, $\lambda$ being the wavelength of the signal to be transmitted or received.

Alternatively, the slot 42 has other shapes, for example, a "bowtie" or "bone" shape.

Preferably, the slot 42 is positioned on the lower ground plane 32 along the longitudinal direction X and the second transverse direction Y so as to be entirely contained within the waveguide opening 14 and not parallel to the small cross-section (short side) of the waveguide 14 for a rectangular waveguide (with or without a ridge). The performance of the transition will be different depending on the position of the slot 42.

Advantageously, the slot 42 is positioned on the lower ground plane 32 along the longitudinal direction X and the second transverse direction Y so as to be in the centre of the cavity delimited by the delimiting means 34. Thus, the slot 42 is located at a maximum of the magnetic field. Advantageously, when the cross-section of the waveguide 14 is such that the waveguide 14 comprises a long side and a short side (such as a ridged, square or rectangular cross-section), the slot 42 is positioned on the lower ground plane 32 so as to be substantially parallel to the long side of the waveguide 14.

Alternatively, the slot 42 is inclined relative to the long side of the waveguide 14.

Advantageously, where the waveguide 14 is a waveguide having at least one rib along its length (ridged waveguide), the waveguide 14 being arranged with respect to the lower ground plane 32 so that the slot 42 is substantially equidistant in the longitudinal direction X, from the rib on the one hand, and from the top of the waveguide 14 on the other.

The delimiting means 34 are configured to delimit a cavity between the upper ground plane 30 and the lower ground plane 32.

In the embodiment shown in FIGS. 1 to 3, the cavity is a so-called SIW (Substrate Integrated Waveguide) cavity, because the lower ground plane 32 and the upper ground plane 30 are formed on the substrate 24 of the printed circuit board 12. The SIW cavity is an integral part of the transition element 20.

In the first embodiment, the delimiting means 34 are inserted into the substrate 24.

The delimiting means 34 are, for example, perforation. A perforation is a metallized hole for establishing an electrical connection between two conductive layers.

Alternatively, the delimiting means 34 are metallized trenches.

Advantageously, the cavity is of length A along the longitudinal direction X, $\lambda$ being the wavelength of the signal to be transmitted or received. More generally, the cavity is of length k. $\lambda/2$ along the longitudinal direction X, with k an integer greater than or equal to two.

The person skilled in the art will thus understand that the length of the cavity is chosen so that the cavity is a resonant cavity, i.e. a hollow space in which the signal to be transmitted or received enters in resonance.

The operation of the assembly 10 in the first embodiment will now be described.

Initially, for a transition from the printed circuit board 12 to the waveguide 14, the signal to be transmitted is picked up by the transmission device 15 via the conductor track 29 connected to the upper ground plane 30.

The signal is then coupled (or injected) into the cavity formed between the upper ground plane 30 and the lower ground plane 32, and delimited by the delimiting means 34.

The signal then exits the transmission device 15 via the slot 42 in the lower ground plane 32 and enters the waveguide 14.

Conversely, for a transition from the waveguide 14 to the printed circuit board 12, the signal to be transmitted is picked up by the transmission device 15 via the slot 42 of the lower ground plane 32.

The signal is then coupled into the cavity formed between the upper ground plane 30 and the lower ground plane 32, and delimited by the delimiting means 34.

The signal then exits the transmission device 15 via the conductor track 29 connected to the upper ground plane 30.

Thus, the transmission device 15 according to the first embodiment allows the transition of a signal between a printed circuit board 12 and a waveguide 14. In particular, the transition element 20 allows a direct transition between the waveguide 14 and the printed circuit board 12 and at 90°, i.e. the transition is positioned in the plane of the cross-section at the end of the waveguide 14.

In particular, in this embodiment, the transition element 20 is fully integrated into the substrate 24 of the printed circuit board 12 and no other parts (connectors, quarter wave cavity) are used to perform the signal transition. The transmission device 15 is therefore compact and simple to implement. It can thus be easily placed on the back of an antenna or more generally of a waveguide.

The presence of the SIW cavity allows the fields to be confined, thus avoiding stray radiation outside the cavity. It also provides shielding from external fields.

Such a device 15 generates low losses, with any losses coming in particular from the substrate 24 of the printed circuit 12 or from the printed metal patterns (in particular, in the microstrip line and the ground planes 30 and 32).

Such a transmission device 15 is adaptable to all types of waveguides regardless of the geometry of its cross-section, whether the waveguide is radiating or not. In the particular case of the ridged waveguide, such a device 15 allows the waveguide to be fed from its long side.

The configuration in which the slot 42 is parallel to the long side of the waveguide and the centre of the cavity allows a potential difference to be induced between the edges of the slot 42, and thus maximises the energy transfer between the SIW cavity and the waveguide.

Such a transmission assembly 10 is, for example, intended to be integrated into an antenna system, such as an active scanning antenna, or into a radar system. For example, an antenna system may consist of several transmission assemblies 10, the waveguides 14 of said assemblies 10 being arranged in parallel. In this case, the waveguides 14 are radiating.

According to a second embodiment as seen in FIG. 4, the elements identical to the assembly 10 according to the first embodiment described in relation to FIGS. 1 to 3 are not repeated. Only differences are highlighted.

In the second embodiment, the conductor track 29 forming the first access means 16 of the transmission device 15 is connected to the lower ground plane 32. In particular, the conductor track 29 protrudes from the lower ground plane 32.

Furthermore, in this second embodiment, the conductor track 29 and the upper ground plane 30 are separated by the substrate 24. Thus, the conductor track 29, the upper ground plane 30 and the substrate 24 form a microstrip line.

Apart from these differences, the operation of the assembly 10 according to the second embodiment is identical to that of the first embodiment.

The transmission device 15 according to the second embodiment has the same advantages as the first embodiment.

Such a device 15 is an alternative for the arrangement of the components of the transition element 20. Indeed, in the first embodiment, the conductor track 29 is integrated on the printed circuit board 12 on the side opposite to the waveguide 14, whereas in the second embodiment, the conductor track 29 is integrated on the printed circuit board 12 on the side of the waveguide 14. The choice of either configuration depends on environmental and design constraints. For example, if the components of the printed circuit board 12 are to be placed on the surface of the waveguide 14 side, the second embodiment is more suitable.

It will be appreciated by the skilled person that the above-described embodiments are capable of being combined with each other where such a combination is compatible.

The invention claimed is:

1. A signal transmission assembly comprising a waveguide and a device for transmitting a signal between a waveguide and a printed circuit board, the device comprising:

a. a first access means for the signal to be transmitted, b. a second access means for the signal to be transmitted, c. a conductor track forming the first access means, d. a printed circuit board comprising a substrate, and e. a transition element comprising:

i. an upper ground plane formed on the substrate of the printed circuit board, ii. a lower ground plane for direct contact with the waveguide, the lower ground plane comprising a slot forming the second access means of the transmission device, iii. means for delimiting a cavity between the upper ground plane and the lower ground plane, either the upper ground plane or the lower ground plane being connected to the conductor track, the waveguide is a waveguide having at least one rib along its length, the waveguide being arranged with respect to the lower ground plane so that the slot is substantially equidistant from the rib and from the top of the waveguide.

2. The assembly according to claim 1, wherein the cavity is an SIW cavity.

3. The assembly according to claim 1, wherein the cavity is a resonant cavity.

4. The assembly according to claim 1, wherein the cavity is of length λ along the length of the substrate, λ being the wavelength of the signal to be transmitted.

5. The assembly according to claim 1, wherein the conductor track protrudes from the upper ground plane.

6. The assembly according to claim 1, wherein the conductor track protrudes from the lower ground plane.

7. The assembly according to claim 1, wherein the lower ground plane is provided on the substrate of the printed circuit board.

8. The assembly according to claim 1, wherein the delimiting means are perforations.

9. The assembly according to claim 1, wherein the slot in the lower ground plane is arranged to be in the centre of the cavity delimited by the delimiting means.

10. The assembly according to claim 1, wherein when the cross-section of the waveguide is such that the waveguide comprises a cross-sectional length, referred to as the long side, and a cross-sectional width, referred to as the short side, the slot is positioned on the lower ground plane so as to be substantially parallel to the long side of the waveguide.

11. An antenna system comprising at least two signal transmission assemblies according to claim 1, the waveguides of said assemblies being arranged in parallel.

* * * * *